United States Patent
Hong et al.

(10) Patent No.: US 9,831,780 B2
(45) Date of Patent: Nov. 28, 2017

(54) BUCK-BOOST CONVERTER AND METHOD FOR CONTROLLING BUCK-BOOST CONVERTER

(71) Applicant: MEDIATEK INC., Hsin-Chu (TW)

(72) Inventors: Hao-Ping Hong, Hsinchu County (TW); Shih-Mei Lin, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 15/209,750

(22) Filed: Jul. 13, 2016

(65) Prior Publication Data
US 2017/0040898 A1 Feb. 9, 2017

Related U.S. Application Data

(60) Provisional application No. 62/202,602, filed on Aug. 7, 2015.

(51) Int. Cl.
*H02M 3/158* (2006.01)
*G05F 1/62* (2006.01)
*H02M 1/00* (2006.01)

(52) U.S. Cl.
CPC ............ *H02M 3/1582* (2013.01); *G05F 1/62* (2013.01); *H02M 3/158* (2013.01); *H02M 3/1584* (2013.01); *H02M 3/1588* (2013.01); *H02M 2001/0054* (2013.01); *Y02B 70/1491* (2013.01)

(58) Field of Classification Search
CPC .. H02M 3/158; H02M 3/1582; H02M 3/1584; H02M 3/1588
See application file for complete search history.

(56) References Cited

U.S. PATENT DOCUMENTS

| 5,402,060 A | 3/1995 | Erisman |
| 6,166,527 A | 12/2000 | Dwelley et al. |
| 7,692,416 B2 | 4/2010 | Shimizu |

(Continued)

FOREIGN PATENT DOCUMENTS

CN 102684484 A 9/2012

OTHER PUBLICATIONS

Stefan Waffler et al., A Novel Low-Loss Modulation Strategy for High-Power Bidirectional Buck + Boost Converters, IEEE Transactions on Power Electronics, vol. 24, No. 6, XP011262259, Jun. 2009, pp. 1589-1599.

*Primary Examiner* — Fred E Finch, III
*Assistant Examiner* — Rafael O De Leon Domenech
(74) *Attorney, Agent, or Firm* — Winston Hsu

(57) ABSTRACT

A buck-boost converter includes an inductor, a first switch, a second switch, a third switch, a fourth switch and a fifth switch, wherein the first switch is coupled between an input voltage and a first terminal of the inductor, the second switch is coupled between a reference voltage and the first terminal of the inductor, the third switch is coupled between an output voltage and a second terminal of the inductor, the fourth switch is coupled between the reference voltage and the second terminal of the inductor, and the fifth switch is connected in parallel with the third switch. When the buck-boost converter operates in a buck mode, the first switch and the second switch are turned on alternately; when the buck-boost converter operates in a boost mode, the third switch and the fourth switch are turned on alternately; and the fifth switch is controlled by a mode control signal.

12 Claims, 8 Drawing Sheets

(56) References Cited

U.S. PATENT DOCUMENTS

2012/0274295 A1* 11/2012 Lin ................... H02M 3/1582
  323/282
2015/0069956 A1   3/2015 Hu
2015/0381039 A1* 12/2015 Hari .................. H02M 1/15
  323/271

* cited by examiner

BUCK-BOOST CONVERTER AND METHOD FOR CONTROLLING BUCK-BOOST CONVERTER

CROSS REFERENCE TO RELATED APPLICATIONS

This application claims the priority of U.S. Provisional Application No. 62/202,602, filed on Aug. 7$^{th}$, 2015, which is included herein by reference in its entirety.

BACKGROUND

A buck-boost converter is generally used in an electronic device to provide a stable output voltage while receiving an input voltage with wide range. The U.S. Pat. Nos. 6,166,527, 5,402,060 and 7,692,416 disclose the techniques about the buck-boost converter, however, in the buck-boost switching regulator disclosed by U.S. Pat. No. 6,166,527 and the buck-boost converter disclosed by U.S. Pat. No. 5,402,060, the switch connected to the output voltage cannot conduct both high voltage and low voltage (close to zero/ground), which may decrease the efficiency; and in the voltage up-and-down DC-DC converter disclosed by U.S. Pat. No. 7,692,416, two transistors of the transmission gate connected to the output voltage are controlled by the related signals in the buck mode and the boost mode, and the switching loss may be increased in this operation.

Therefore, how to provide a buck-boost converter which may have both better efficiency and lower switching loss is an important topic.

SUMMARY

It is therefore an objective of the present invention to provide a buck-boost converter having better efficiency, lower switching loss and wide output range, to solve the above-mentioned problem.

According to one embodiment of the present invention, a buck-boost converter for receiving an input voltage to generate an output voltage is provided. The buck-boost converter comprises an inductor, a first switch, a second switch, a third switch, a fourth switch and a fifth switch, wherein the first switch is coupled between the input voltage and a first terminal of the inductor, the second switch is coupled between a reference voltage and the first terminal of the inductor, the third switch is coupled between the output voltage and a second terminal of the inductor, the fourth switch is coupled between the reference voltage and the second terminal of the inductor, and the fifth switch is connected in parallel with the third switch. In the operations of the buck-boost converter, when the buck-boost converter operates in a buck mode, each of the first switch and the second switch is turned on and off alternately; when the buck-boost converter operates in a boost mode, each of the third switch and the fourth switch is turned on and off alternately; and the fifth switch is controlled to be on or off by referring to a mode control signal that represents the buck mode or the boost mode.

According to one embodiment of the present invention, a method for controlling a buck-boost converter is provided, wherein the buck-boost converter is arranged to receive an input voltage to generate an output voltage, and the buck-boost converter comprises an inductor, a first switch, a second switch, a third switch, a fourth switch and a fifth switch, the first switch is coupled between the input voltage and a first terminal of the inductor, the second switch is coupled between a reference voltage and the first terminal of the inductor, the third switch is coupled between the output voltage and a second terminal of the inductor, the fourth switch is coupled between the reference voltage and the second terminal of the inductor, and the fifth switch is connected in parallel with the third switch, and the method comprises: when the buck-boost converter operates in a buck mode, controlling each of the first switch and the second switch to turn on and off alternately; when the buck-boost converter operates in a boost mode, controlling each the third switch and the fourth switch to turn on and off alternately; and controlling the fifth switch to be on or off by referring to a mode control signal that represents the buck mode or the boost mode.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
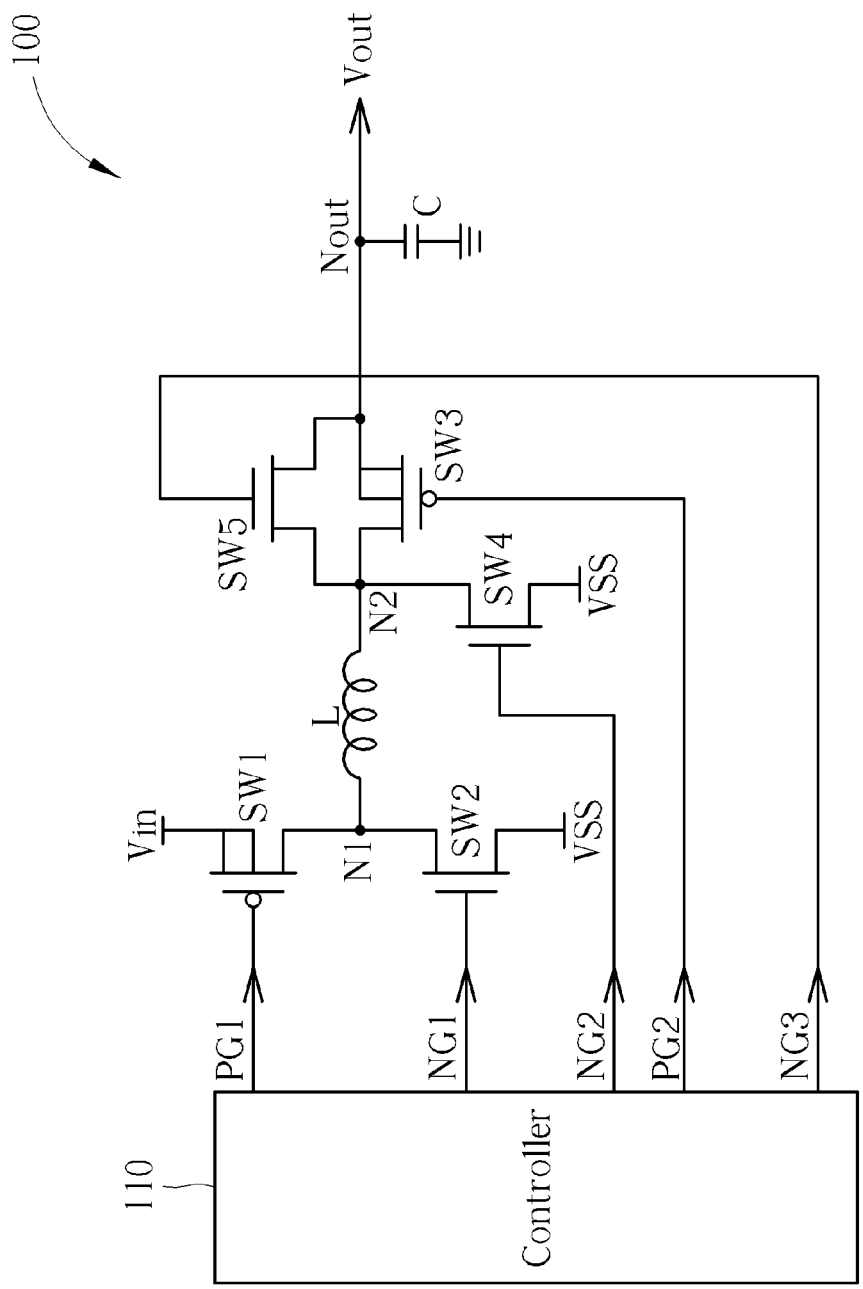
FIG. 1 is a diagram illustrating a buck-boost converter according to one embodiment of the present invention.

Please refer to FIG. 1, which is a diagram illustrating a buck-boost converter 100 according to one embodiment of the present invention. As shown in FIG. 1, the buck-boost converter 100 is arranged to receive an input voltage Vin from a battery or any other supply voltage provider to generate a stable output voltage Vout at an output node Nout, and the buck-boost converter 100 comprises five switches SW1-SW5, an inductor L, and a capacitor C, where the switch SW1 is implemented by a PMOS and coupled between the input voltage Vin and a first terminal N1 of the inductor L, the switch SW2 is implemented by an NMOS and coupled between the first terminal N1 of the inductor L and a reference voltage VSS (in this embodiment, the reference voltage is a ground voltage), the SW3 is implemented by a PMOS and coupled between the output voltage Vout and a second terminal N2 of the inductor L, the SW4 is implemented by an NMOS and coupled between the second terminal N2 of the inductor L and the reference voltage, and the switch SW5 is implemented by an NMOS and is positioned parallel with the switch SW3.

In addition, the buck-boost converter 100 further comprises a control circuit 110 to generate five control signals PG1, NG1, PG2, NG2 and NG3 to control the switches SW1-SW5, respectively. In the operations of the control circuit 110, the control circuit 110 can determine a mode (buck mode or boost mode) of the buck-boost converter 100 according to information within the buck-boost converter 100, and control circuit 110 generates the control signals PG1, NG1, PG2, NG2 and NG3 according to the mode of the buck-boost converter 100. For example, the control circuit 110 may determine the mode of the buck-boost converter 100 according to at least one of the input voltage Vin, the output voltage Vout, a duty cycle of a portion of the control signals PG1, NG1, PG2, NG2 and NG3, or any suitable control signal within the control circuit 110. Details of the determination of the mode are described in the following figures.

Figure 2:
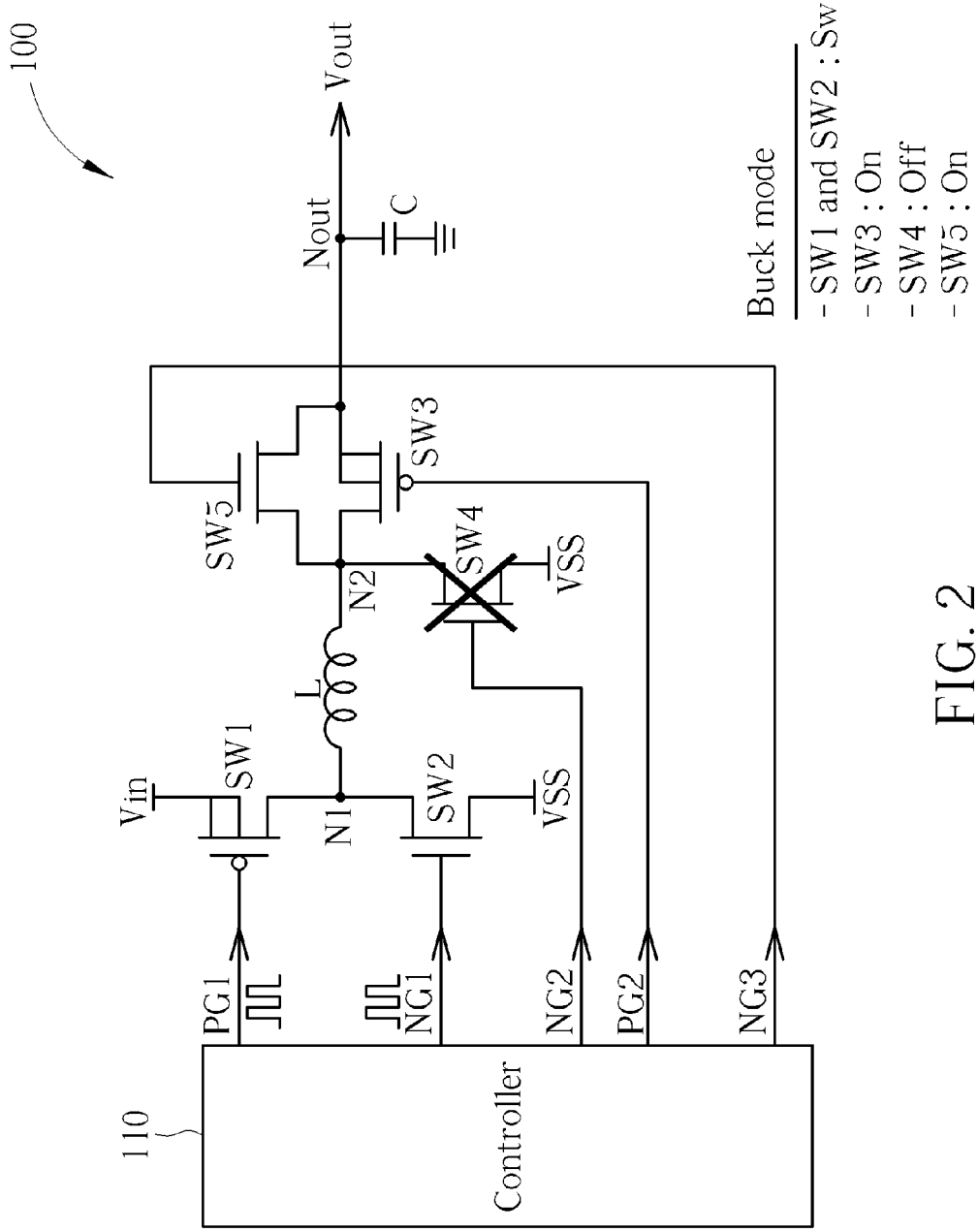
FIG. 2 is a diagram illustrating the buck mode of the buck-boost converter according to one embodiment of the present invention.

Please refer to FIG. 2, which is a diagram illustrating the buck mode of the buck-boost converter 100 according to one embodiment of the present invention. As shown in FIG. 2, when the buck-boost converter 100 operates in the buck mode, the control circuit 110 generates the control signals PG1 and NG1 to control the switches SW1 and SW2, respectively, to make the switches SW1 and SW2 to turn on and off alternately, and the switches SW1 and SW2 are not turned on simultaneously. The control circuit 110 further generates the control signal PG2 to always turn on the switch SW3, and further generates the control signal NG2 to always turn off the switch SW4, and generates the control signal NG3 to turn on the switch SW5. In this embodiment, the switches SW3 and SW5 are turned on simultaneously, and because the NMOS switch can conduct low voltage (close to zero/ground voltage), so the output node Nout is allowed to receive the low voltage (close to zero/ground voltage), and the efficiency of the buck-boost converter 100 operated in the buck mode can be improved.

Figure 3:
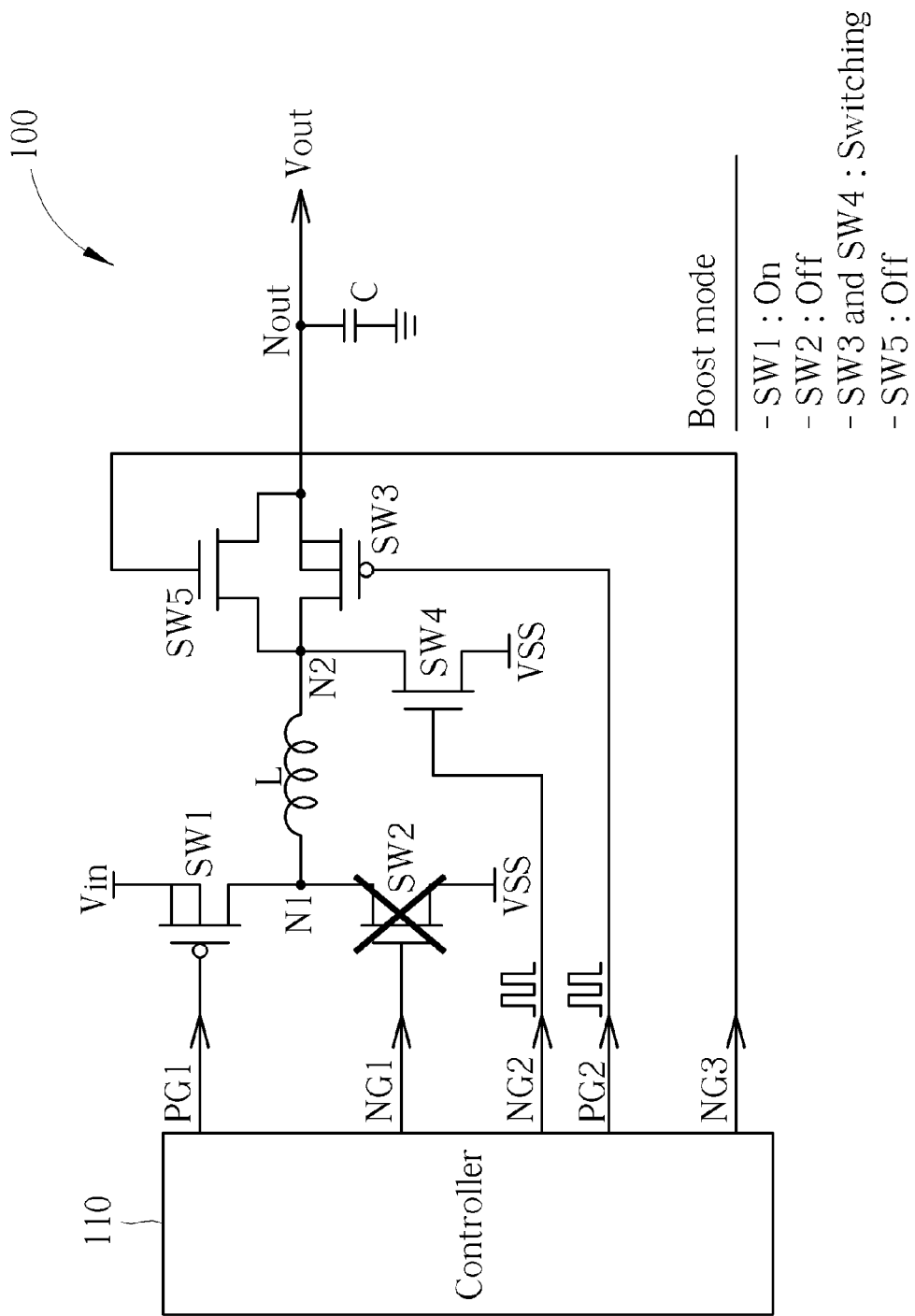
FIG. 3 is a diagram illustrating the boost mode of the buck-boost converter according to one embodiment of the present invention.

Please refer to FIG. 3, which is a diagram illustrating the boost mode of the buck-boost converter 100 according to one embodiment of the present invention. As shown in FIG. 3, when the buck-boost converter 100 operates in the boost mode, the control circuit 110 generates the control signal PG1 to always turn on the switch SW1, and generates the control signal NG1 to always turn off the switch SW2, and further generates the control signals PG2 and NG2 to control the switches SW3 and SW4, respectively, to make the switches SW3 and SW4 to turn on and off alternately, and the switches SW3 and SW4 are not turned on simultaneously. In addition, the control circuit 110 generates the mode control signal NG3 to turn off the switch SW5. In this embodiment, because the PMOS switch SW3 can conduct the high voltage and is capable of doing the work efficiently, so the switch SW5 is turned off to reduce the switching loss.

Figure 4:
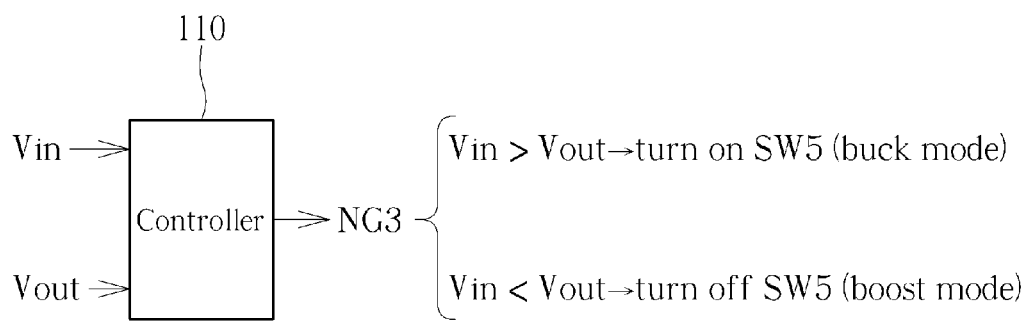
FIG. 4 is a diagram illustrating the generation of the control signal NG3 according to a first embodiment of the present invention.

Regarding the generation of the control signal NG3, in a first embodiment shown in FIG. 4, control circuit 110 may compare the input voltage Vin and the output voltage Vout to generate the mode control signal NG3. In this embodiment, when the input voltage Vin is greater than the output voltage Vout, it is determined that the buck-boost converter 100 operates in the buck mode, and the switch SW5 is turned on by the mode control signal NG3; and when the input voltage is less than the output voltage Vout, it is determined that the buck-boost converter 100 operates in the boost mode, and the switch SW5 is turned off by the mode control signal NG3. In addition, in other embodiments of the present invention, the control circuit 110 may determines the mode of the buck-boost converter 100 according to information generated based on the input voltage Vin and the output voltage Vout, for example, Vin/Vout, Vout/Vin, Vin/Vref or Vout/Vref, where "Vref" may be any suitable value.

Figure 5:
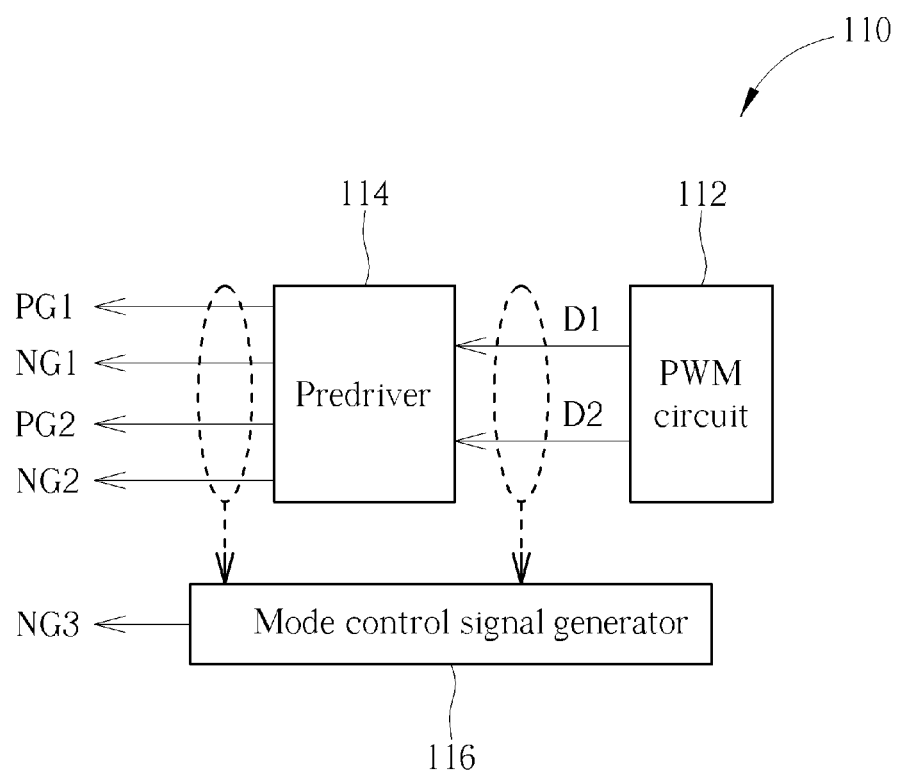
FIG. 5 is a diagram illustrating the generation of the control signal NG3 according to a second embodiment of the present invention.

Please refer to FIG. 5, which is a diagram illustrating the generation of the mode control signal NG3 according to a second embodiment of the present invention. In this embodiment, the control circuit 110 comprises a pulse-width modulation (PWM) circuit 112, a predriver 114 and a mode control signal generator 116. The PWM circuit 112 is arranged to generate a duty cycle information D1 corresponding to the control signals PG1 and NG1, and to generate a duty cycle information D2 corresponding to the control signals PG2 and NG2; and the predriver 114 is arranged to generate the control signals PG1, NG1, PG2 and NG2 according to the duty cycle information D1 and D2. The mode control signal generator 116 is arranged to generate the mode control signal NG3 according to a current mode of the buck-boost converter 100, where the current mode may be a buck mode or a boost mode. In the operations of the control circuit 110 shown in FIG. 5, the mode control signal generator 116 may refer to at least one of the duty cycle information D1 and D2 and the control signals PG1, PG2, NG1 and NG2 to generate the control signal NG3. For example, because each of the control signals PG1, PG2, NG1 and NG2 has different patterns for the buck mode and the boost mode, so the mode control signal generator 116 may perform some logical calculations upon at least one of the control signals PG1, PG2, NG1 and NG2 to generate the mode control signal NG3. In another embodiment, because when the buck-boost converter 100 operates from the buck mode to the boost mode, the duty cycle of the control signal PG1 will largely increase and almost reach to 100%, so the mode control signal generator 116 can refer to the duty cycle of the control signal PG1 to determine the current mode of the buck-boost converter 100 to generate the control signal NG3. In yet another embodiment, because when the buck-boost converter 100 operates from the boost mode to the buck mode, the duty cycle of the control signal PG2 will largely decrease and almost reach to 0%, so the mode control signal generator 116 can refer to the duty cycle of the control signal PG2 to determine the current mode of the buck-boost converter 100 to generate the control signal NG3.

Figure 6:
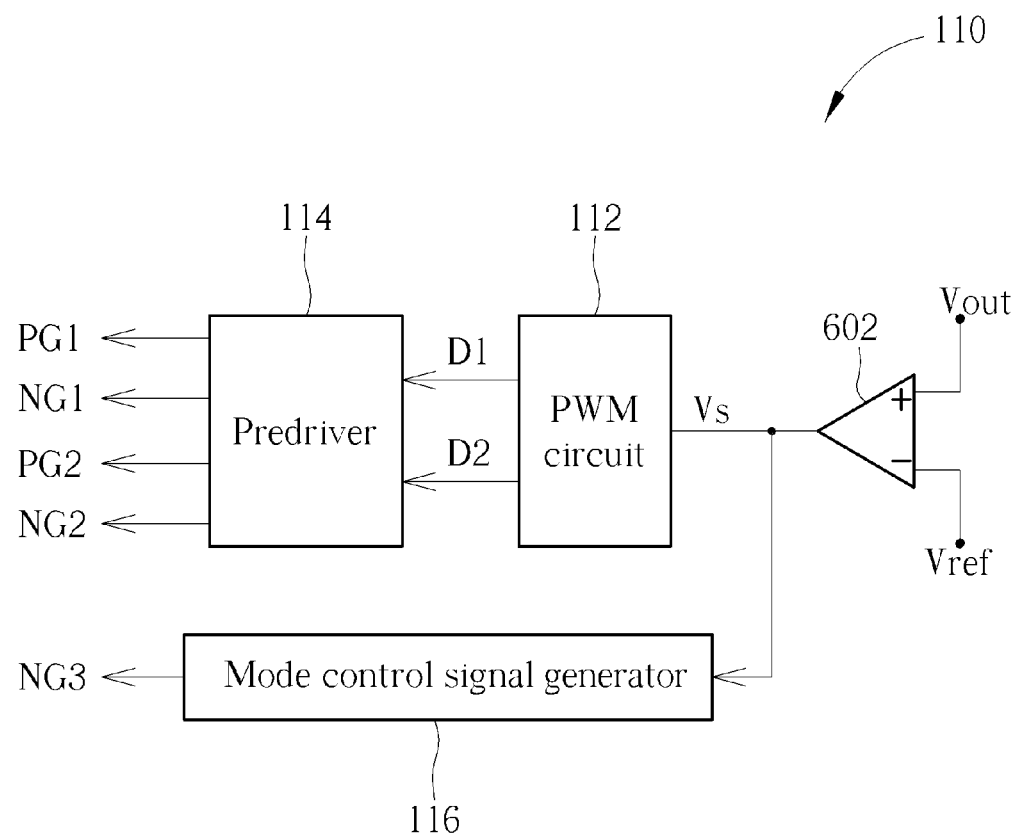
FIG. 6 is a diagram illustrating the generation of the control signal NG3 according to a third embodiment of the present invention.

Please refer to FIG. 6, which is a diagram illustrating the generation of the mode control signal NG3 according to a third embodiment of the present invention. As shown in FIG. 6, the buck-boost converter 100 further comprises a comparator 602, and the comparator 602 compares the output voltage Vout and a reference voltage to generate a comparison result Vs. In this embodiment, the comparison result Vs is proportional to the output voltage Vout (assuming that the input voltage does not change), therefore, when the comparison result Vs continuously increases to reach a threshold, the mode control signal generator 116 can determine that the buck-boost converter 100 operates in the boost mode, and the control signal generator 116 generates the mode control signal NG3 to turn off the switch SW5.

Figure 7:
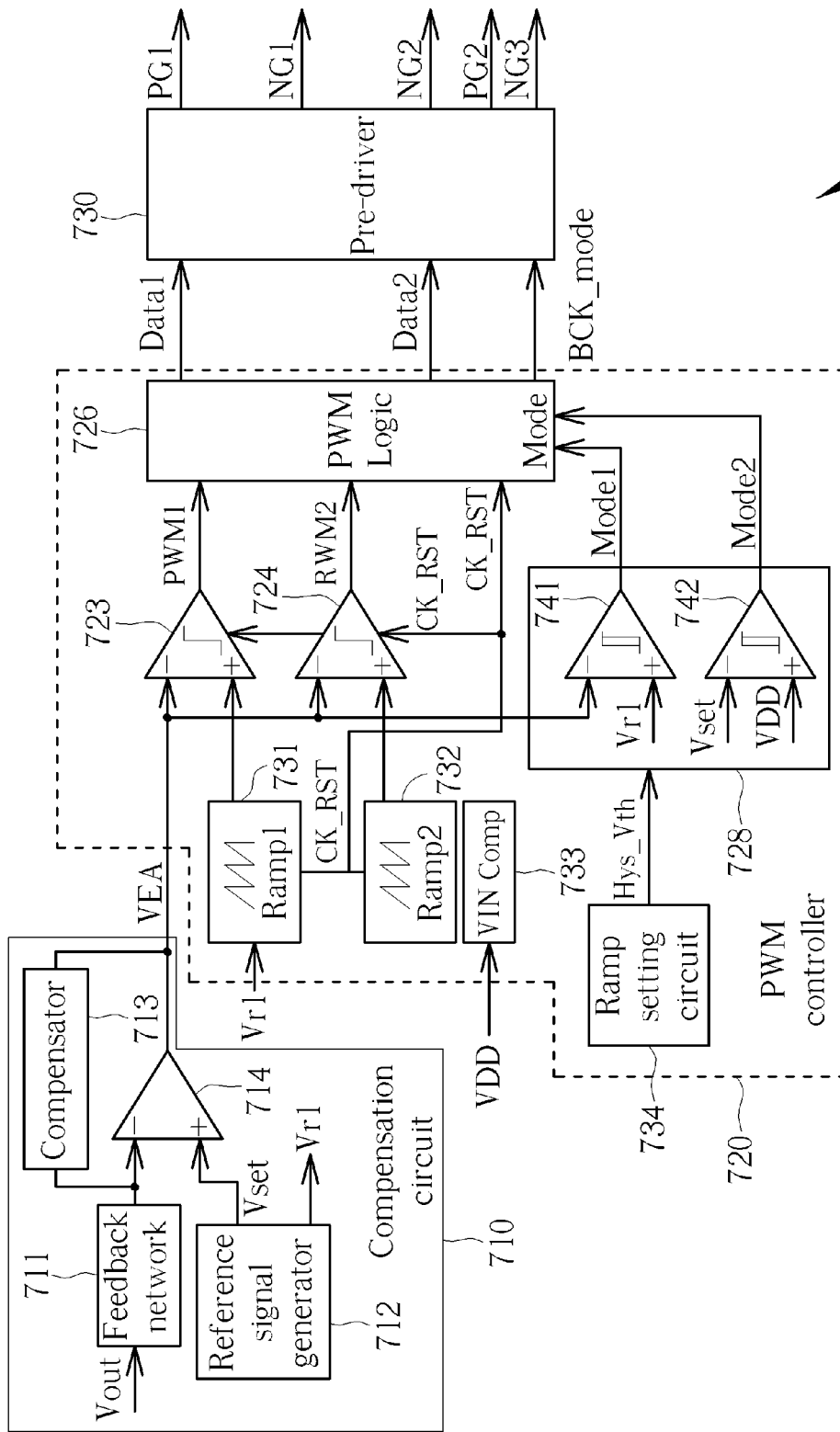
FIG. 7 is a diagram illustrating the control circuit according to another embodiment of the present invention.

Please refer to FIG. 7, which is a diagram illustrating the control circuit 110 according to another embodiment of the present invention. In this embodiment, the control circuit 110 comprises a compensation circuit 710, a PWM controller 720 and a pre-driver 730. The compensation circuit 710 is arranged to provide several reference voltages to the PWM controller 720, and the PWM controller 720 generates duty cycle information and mode control information to the pre-driver 730 to generate the control signals PG1, NG1, PG2, NG2 and NG3.

In detail, the compensation circuit 710 comprises a feedback network 711, a reference signal generator 712, a compensator 713 and a comparator 714. The reference signal generator 712 is arranged to generate a reference voltage Vset to a positive input terminal of the comparator 714, and further generates a reference voltage Vr1 to the PWM controller 720. The comparator 714 compares the reference voltage with the output voltage Vout to generate an error signal VEA to the PWM controller 720.

The PWM controller 720 comprises a circuit 722, two comparator 723 and 724, a hysteresis comparator module 728 and a PWM logic 726. The circuit 722 comprises a first ramp signal generator 731, a second ramp signal generator 732, an input voltage comparator 733 and a ramp setting circuit 734. The first ramp signal generator 731 is arranged to generate a ramp signal Ramp1 to the comparator 723, and the comparator 723 compares the ramp signal Ramp1 with the error signal VEA to generate a first PWM signal PWM1; and the second ramp signal generator 732 is arranged to generate a ramp signal Ramp2 to the comparator 724, and the comparator 724 compares the ramp signal Ramp2 with the error signal VEA to generate a second PWM signal PWM2. The input voltage comparator 733 is arranged to compare the input voltage Vin with a setup output voltage to selectively force the mode switching. The ramp setting circuit 734 is controlled to provide hysteresis thresholds Hys_Vth (e.g. a high threshold Vthh and a low threshold Vthn) to the hysteresis comparator module 728, and a hysteresis comparator 741 compares the error signal VEA with the reference signal Vr1 to generate a mode signal Mode1, and a hysteresis comparator 742 compares the reference signal Vset with the supply voltage VDD to generate a mode signal Mode2 according to the hysteresis thresholds Hys_Vth. Then, the PWM logic 726 generates the duty cycle information Data1 and Data2 of the control signals PG1, NG1, PG2 and NG2 and a mode signal to the pre-driver 730 according to at least the first PWM signal PWM1, the second PWM signal PWM2, the mode signal Mode1 and the mode signal Mode2. In this embodiment, the duty cycle information D1 corresponding to the control signals PG1 and NG1, and the duty cycle information D2 corresponding to the control signals PG2 and NG2.

In the embodiment shown in FIG. 7, a clock reset signal CK_RST is arranged to avoid the comparator saturation issue and to improve the comparator response time.

Figure 8:
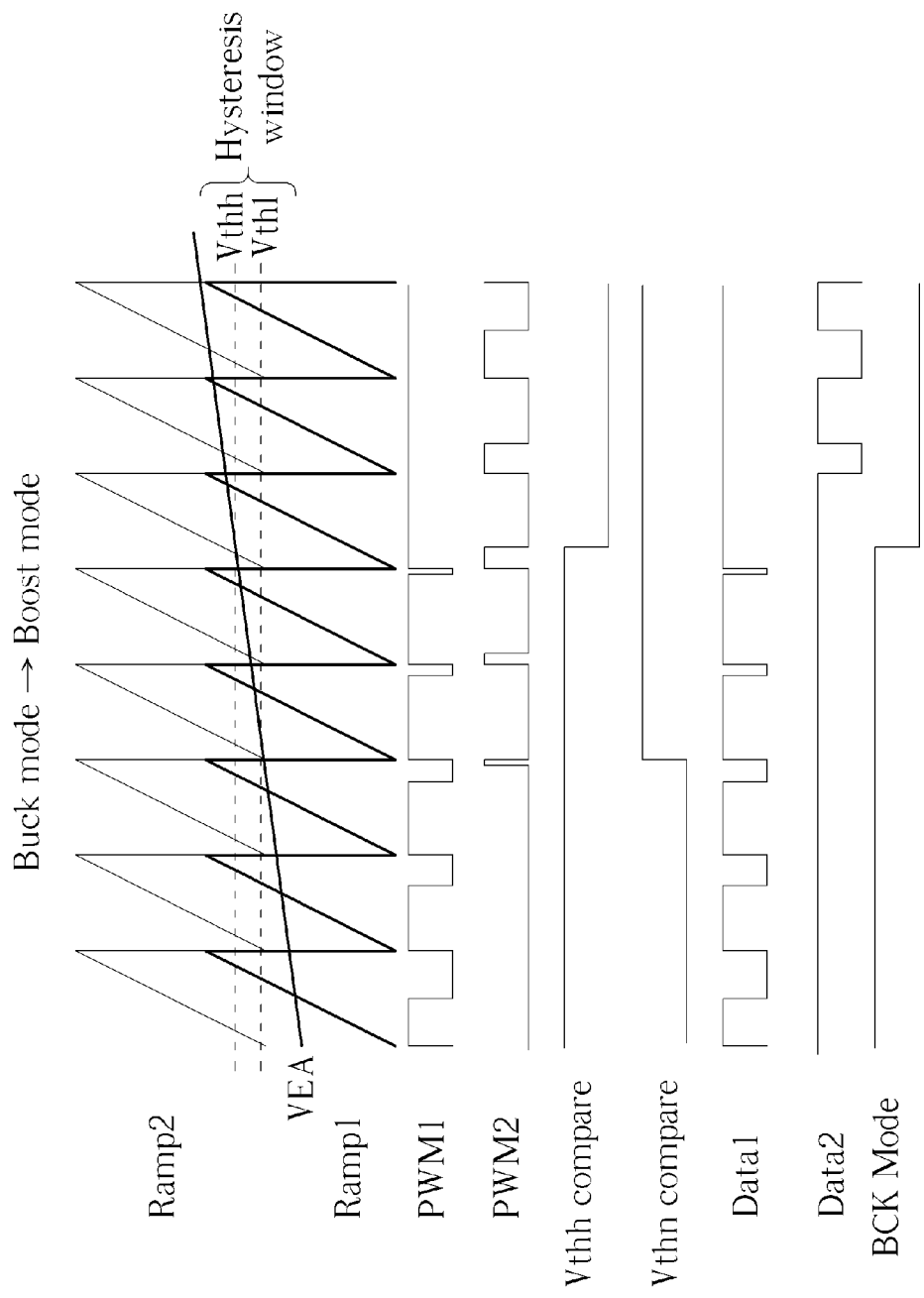
FIG. 8 shows a timing diagram of the signals shown in FIG. 7 when the buck-boost converter operates from the buck mode to the boost mode according to one embodiment of the present invention.

The PWM logic 726 may control the buck-boost operations to have several transition modes when the mode switching occurs. For example, FIG. 8 shows a timing diagram of the signals shown in FIG. 7 when the buck-boost converter 100 operates from the buck mode to the boost mode according to one embodiment of the present invention. In this embodiment, even if the comparison result for the low threshold Vthn of the hysteresis window is high, the PWM logic 726 still outputs the duty cycle information Data1 until the mode signal BCK_mode goes low (i.e. the buck-boost converter 100 enters the boost mode), and then PWM logic 726 outputs the duty cycle information Data2. In other words, the buck mode and the boost mode are roaming and two of the switches SW1-SW5 shown in FIG. 1 are toggling. In another embodiment, a seamless control may be applied, and during the transition when the buck-boost converter 100 is switching from the buck mode to the boost mode, the four switches SW1-SW4 are all toggling during this period.

Figure 9:
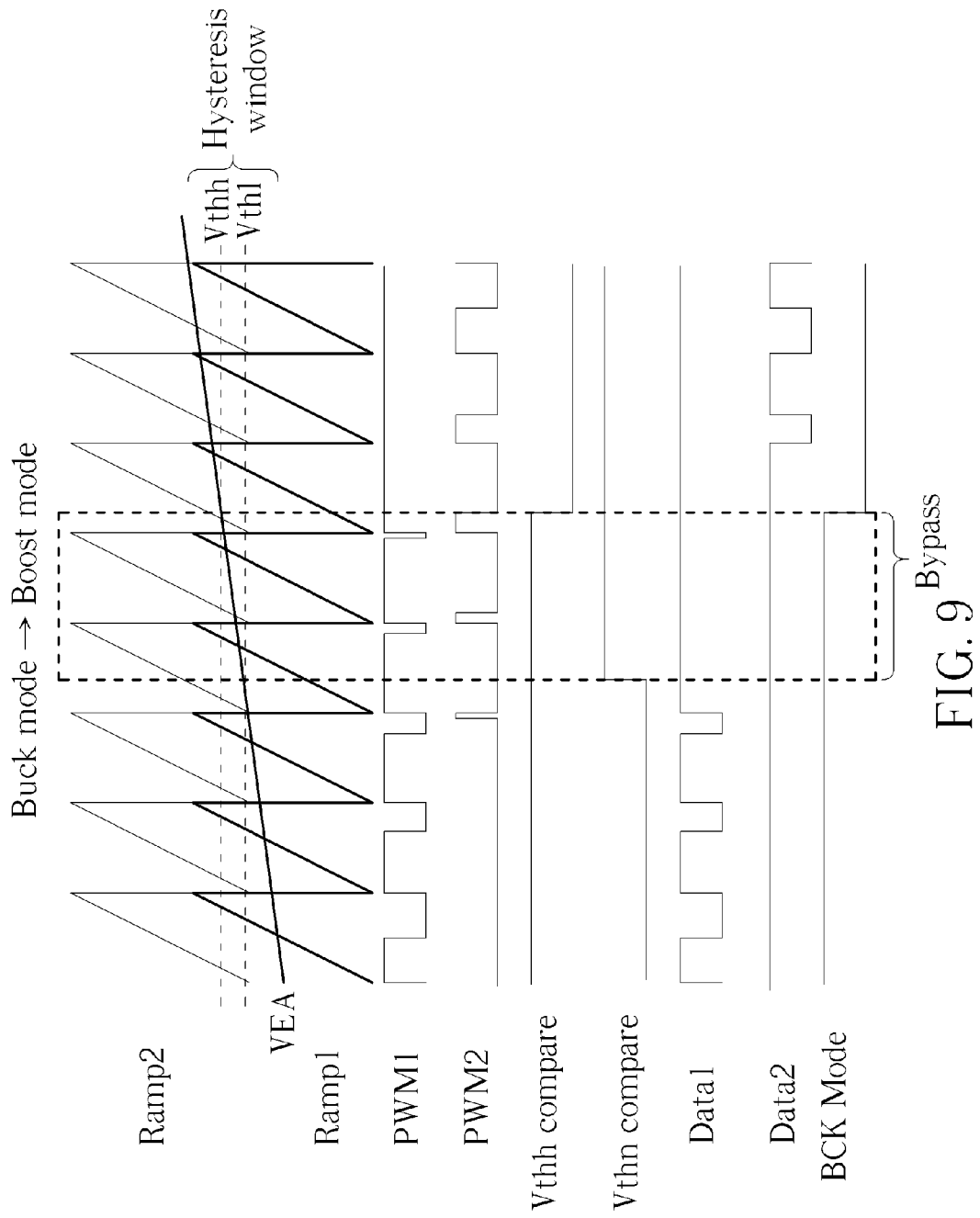
FIG. 9 shows a timing diagram of the signals shown in FIG. 7 when the buck-boost converter operates from the buck mode to the boost mode according to another embodiment of the present invention.

FIG. 9 shows a timing diagram of the signals shown in FIG. 7 when the buck-boost converter 100 operates from the buck mode to the boost mode according to another embodiment of the present invention. In this embodiment, the comparison result for the low threshold Vthn of the hysteresis window is high, the PWM logic 726 stops generating the duty cycle information Data1, and when the mode signal BCK_mode goes low (i.e. the buck-boost converter 100 enters the boost mode), and the PWM logic 726 starts to output the duty cycle information Data2. That is, during the transition when the buck-boost converter 100 is switching from the buck mode to the boost mode, a bypass period is existed.

Briefly summarized, in the buck-boost converter of the present invention, an additional switch SW5 is provided to conduct the low voltage (close to zero/ground voltage) to make the buck-boost converter to work efficiently in the buck mode. In addition, the switch SW5 is turned off when the buck-boost converter operates in the boost mode to reduce the switching loss. Therefore, buck-boost converter may improve both the efficiency and switching loss, to solve the above-mentioned problem.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A buck-boost converter, for receiving an input voltage to generate an output voltage, comprising:
   an inductor, comprising a first terminal and a second terminal;
   a first switch, coupled between the input voltage and the first terminal of the inductor;
   a second switch, coupled between a reference voltage and the first terminal of the inductor;
   a third switch, coupled between the output voltage and the second terminal of the inductor;
   a fourth switch, coupled between the reference voltage and the second terminal of the inductor; and
   a fifth switch, wherein the fifth switch is connected in parallel with the third switch; and
   wherein when the buck-boost converter operates in a buck mode, each of the first switch and the second switch is turned on and off alternately according to duty cycle information of a first pulse width modulation (PWM) signal; when the buck-boost converter operates in a boost mode, each of the third switch and the fourth switch is turned on and off alternately according to duty cycle information of a second PWM signal;

and the fifth switch is controlled to be on or off by referring to a mode control signal that represents the buck mode or the boost mode, and the mode control signal is generated without using the duty cycle information of the first PWM signal and the second PWM signal.

2. The buck-boost converter of claim 1, wherein when the buck-boost converter operates in the boost mode, the first switch turns on, the second switch turns off, and the fifth switch turns off.

3. The buck-boost converter of claim 1, wherein when the buck-boost converter operates in the buck mode, the third switch turns on, the fourth switch turns off, and the fifth switch turns on.

4. The buck-boost converter of claim 1, wherein the third switch is a P-type metal-oxide-semiconductor (PMOS), and the fifth switch is an N-type metal-oxide-semiconductor (NMOS).

5. The buck-boost converter of claim 1, further comprising:
a control circuit, for comparing the input voltage and the output voltage to generate the mode control signal.

6. The buck-boost converter of claim 1, further comprising:
a control circuit, for comparing the output voltage with a reference voltage to generate a comparison result, and generating the mode control signal according to the comparison result.

7. A method for controlling a buck-boost converter, wherein the buck-boost converter is arranged to receive an input voltage to generate an output voltage, and the buck-boost converter comprises an inductor, a first switch, a second switch, a third switch, a fourth switch and a fifth switch, the first switch is coupled between the input voltage and a first terminal of the inductor, the second switch is coupled between a reference voltage and the first terminal of the inductor, the third switch is coupled between the output voltage and a second terminal of the inductor, the fourth switch is coupled between the reference voltage and the second terminal of the inductor, and the fifth switch is connected in parallel with the third switch, and the method comprises:
when the buck-boost converter operates in a buck mode, controlling each of the first switch and the second switch to turn on and off alternately according to duty cycle information of a first pulse width modulation (PWM) signal;
when the buck-boost converter operates in a boost mode, controlling each the third switch and the fourth switch to turn on and off alternately according to duty cycle information of a second PWM signal; and
controlling the fifth switch to be on or off by referring to a mode control signal that represents the buck mode or the boost mode, wherein the mode control signal is generated without using the duty cycle information of the first PWM signal and the second PWM signal.

8. The method of claim 7, further comprising:
when the buck-boost converter operates in the boost mode, turning on the first switch, turning off the second switch, and turning off the fifth switch.

9. The method of claim 7, further comprising:
when the buck-boost converter operates in the buck mode, turning on the third switch, turning off the fourth switch, and turning on the fifth switch.

10. The method of claim 7, wherein the third switch is a P-type metal-oxide-semiconductor (PMOS), and the fifth switch is an N-type metal-oxide-semiconductor (NMOS).

11. The method of claim 7, further comprising:
comparing the input voltage and the output voltage to generate the mode control signal.

12. The method of claim 7, further comprising:
comparing the output voltage with a reference voltage to generate a comparison result; and
generating the mode control signal according to the comparison result.

* * * * *